US012288253B2

(12) United States Patent
Weng et al.

(10) Patent No.: US 12,288,253 B2
(45) Date of Patent: Apr. 29, 2025

(54) COMPUTER METHODOLOGY PROVIDING AS-OF-DAY VOLATILITY SURFACE CONSTRUCTION FOR PRICING

(71) Applicant: Chicago Mercantile Exchange Inc., Chicago, IL (US)

(72) Inventors: Jennifer Weng, Brooklyn, NY (US); Ziyi Wang, Chicago, IL (US); Xianqing Zou, Jersey City, NJ (US); Yingwen Liu, Brooklyn, NY (US); Shuo Liu, London (GB); Chenda Huang, Hoboken, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 338 days.

(21) Appl. No.: 16/700,382

(22) Filed: Dec. 2, 2019

(65) Prior Publication Data
US 2020/0175594 A1 Jun. 4, 2020

Related U.S. Application Data (63) Continuation of application No. 15/404,915, filed on Jan. 12, 2017, now Pat. No. 10,529,022.

(60) Provisional application No. 62/277,605, filed on Jan. 12, 2016.

(51) Int. Cl.
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
CPC ....................................................... G06Q 40/00
USPC .......................................................... 705/37
See application file for complete search history.

(56) References Cited

U.S. PATENT DOCUMENTS

2010/0063915 A1 * 3/2010 Tian ....................... G06Q 40/00
705/35

OTHER PUBLICATIONS

U.S. Appl. No. 62/277,605, filed Jan. 12, 2016, "Volatility Skew Outlier Detection, Version 1.0", pp. 1-10.
U.S. Appl. No. 62/277,605, filed Jan. 12, 2016, "Arbitrage Check For Athena Release 2", pp. 1-8.
U.S. Appl. No. 62/277,605, filed Jan. 12, 2016, "ATM Volatility Construction-Enhanced Method (Database Oriented), Version 1.0", 7 pages.
U.S. Appl. No. 62/277,605, filed Jan. 12, 2016, "ATM Volatility Construction for Non-Seasonal Product (Database Oriented) Version 1.0", 8 pages.
U.S. Appl. No. 62/277,605, filed Jan. 12, 2016, Implied Volatility Surface Cleansing Procedure, © 2014, CME Group, pp. 1-52.
U.S. Appl. No. 62/277,605, filed Jan. 12, 2016, "Implied Volatility Surface Construction", © 2014 CME Group, pp. 1-25.

(Continued)

*Primary Examiner* — Ojo O Oyebisi
(74) *Attorney, Agent, or Firm* — Lempia Summerfield Katz LLC (57) ABSTRACT

A method and system are disclosed for more efficiently constructing a volatility surface. The methodology results in measurable reduction in the quantity of storage memory space needed on a computer executing the novel methodology, reduces the measurable, on-demand computational load on the processor(s) of a computer executing the novel methodology, and permits as-of-day calculations of the volatility surface that were previously impossible to obtain in near real-time.

24 Claims, 4 Drawing Sheets

(56) References Cited

OTHER PUBLICATIONS

U.S. Appl. No. 62/277,605, filed Jan. 12, 2016, "Pricing Error Analysis Framework, Version 1", pp. 1-16.
U.S. Appl. No. 62/277,605, filed Jan. 12, 2016, "Vol Skew Construction, Version 1.0", 18 pages.
U.S. Appl. No. 62/277,605, filed Jan. 12, 2016, "Volatility Surface Cleansing Procedure", 31 pages.
U.S. Appl. No. 62/277,605, filed Jan. 12, 2016, "Wiggle Adjustment for Raw Implied Volatility Skew (Database Oriented) Version 1.0", 15 pages.
U.S. Appl. No. 62/277,605, filed Jan. 12, 2016, Athena Architectural Diagram, 1 page.
U.S. Appl. No. 62/277,605, filed Jan. 12, 2016, Athena Physical Volume Table, 1 page.
U.S. Appl. No. 62/277,605, filed Jan. 12, 2016, "Implied Volatility Surface Construction", 37 pages.

* cited by examiner

From Pre Vol Surface

| T2M | ATM vol | 0.55 delta vol |
|---|---|---|
| 1 | 0.38 | 0.4 |
| 1.1 | 0.37 | |
| 1.2 | 0.35 | |
| 1.3 | 0.34 | |
| 1.4 | 0.3 | 0.31 |
| 1.5 | 0.29 | 0.3 |
| 1.6 | 0.28 | 0.29 |
| 1.7 | 0.27 | 0.28 |
| 1.8 | 0.25 | |
| 1.9 | 0.24 | |
| 2 | 0.22 | |

302

Calculate ATM add-on For 55% delta term structure

| T2M | 0.55 ATM add-on |
|---|---|
| 1 | 0.02 |
| 1.1 | |
| 1.2 | |
| 1.3 | |
| 1.4 | 0.01 |
| 1.5 | 0.01 |
| 1.6 | 0.01 |
| 1.7 | 0.01 |
| 1.8 | |
| 1.9 | |
| 2 | |

304

Do linear interpolation / Flat extrapolation on add-on

| T2M | 0.55 ATM add-on |
|---|---|
| 1 | 0.02 |
| 1.1 | 0.0175 |
| 1.2 | 0.015 |
| 1.3 | 0.0125 |
| 1.4 | 0.01 |
| 1.5 | 0.01 |
| 1.6 | 0.01 |
| 1.7 | 0.01 |
| 1.8 | 0.01 |
| 1.9 | 0.01 |
| 2 | 0.01 |

306

Add back the add-on value to ATM vol Complete 55% delta term structure

| T2M | ATM vol | 0.55 delta vol |
|---|---|---|
| 1 | 0.38 | 0.4 |
| 1.1 | 0.37 | 0.3875 |
| 1.2 | 0.35 | 0.365 |
| 1.3 | 0.34 | 0.3525 |
| 1.4 | 0.3 | 0.31 |
| 1.5 | 0.29 | 0.3 |
| 1.6 | 0.28 | 0.29 |
| 1.7 | 0.27 | 0.28 |
| 1.8 | 0.25 | 0.26 |
| 1.9 | 0.24 | 0.25 |
| 2 | 0.22 | 0.23 |

COMPUTER METHODOLOGY PROVIDING AS-OF-DAY VOLATILITY SURFACE CONSTRUCTION FOR PRICING

REFERENCE TO RELATED APPLICATIONS

This application is a continuation under 37 C.F.R. § 1.53(b) of U.S. patent application Ser. No. 15/404,915 filed Jan. 12, 2017 now U.S. Pat. No. 10,529,022, which claims priority to U.S. provisional patent application Ser. No. 62/277,605, filed Jan. 12, 2016 the entire disclosures and appendices of which is are hereby incorporated by reference and relied upon.

TECHNICAL FIELD

Embodiments of the present disclosure relate to a novel and non-obvious technological improvement in a methodology for building a volatility surface (represented in, for example, twenty-one anchor points) from input market prices. The methodology results in novel steps being both automated and being performed in not insignificant ways that previously were never performed or even described by others of skill in the art to calculate a volatility surface. The novel methodology results in measurable reduction in the quantity of storage memory space needed on a computer executing the novel methodology, and permits as-of-day calculations of the volatility surface that were previously impossible to obtain in near real-time. The novel methodology also reduces the measurable, on-demand computational load on the processor(s) of a computer executing the novel methodology. Therefore, the disclosure describes computer systems and methods for creating volatility surfaces that can be, inter alia, used for pricing and risk management of options on futures.

DESCRIPTION OF RELATED ART

Exchanges have known and used volatility surface computations for pricing options. In 1973, the Black-Scholes model was developed to price options. That model assumes six variables, however, of these six variables, the volatility variable is uncertain and must be estimated. Given this uncertainty, the volatility surface is often constructed as a three-dimensional plot where x-axis is the time to maturity (or expiry), the z-axis is the strike price relative to the underlying asset, and the y-axis is the implied volatility (expected volatility in the underlying asset during the life of the option).

On the y-axis, the implied volatility shows where volatility should be in the future. It is forward-looking and gauges the sentiment about the volatility of a stock or the market. However, it does not forecast the direction in which an option will be headed. Moreover, implied volatility assumes the same level of volatility exists for all options of the same asset with the same expiry. However, the Black-Scholes model is not completely correct because if it was, then the theoretical y-axis (implied volatility) would be flat. In practice, however, this is not the case.

For example, in practice volatility surfaces are not flat. For example, every option chain is different, and the shape of the volatility surface can be wavy across strike price and time. Moreover, put and call options usually have different volatility surfaces. Meanwhile, options with lower strike prices tend to have higher implied volatilities. In addition, in a behavior often called volatility smile, for a given strike price, implied volatility can be increasing or decreasing with time to maturity. Also, in some examples, as time to maturity approaches infinity, volatilities across strike prices tend to converge to a constant level. In yet other examples, options with shorter time to maturity have multiple times the volatility than options. Finally, some effects can be more pronounced in periods of high market stress.

Meanwhile, exchanges are typically associated with clearing houses that are responsible for settling trading accounts, clearing trades, collecting and maintaining performance bond funds, regulating delivery and reporting trading data. Clearing is the procedure through which the clearing house becomes buyer to each seller of a contract, and seller to each buyer, and assumes responsibility for protecting buyers and sellers from financial loss by assuring performance on each contract. This is effected through the clearing process, whereby transactions are matched.

Clearing houses establish clearing level performance bonds (margins) for traded financial products and establish minimum performance bond requirements for customers. A performance bond, also referred to as a margin, is the funds that may be required to be deposited by a customer with his or her broker, by a broker with a clearing member or by a clearing member with the clearing house, for the purpose of insuring the broker or clearing house against loss on open contracts. The performance bond is not a part payment on a purchase and helps to ensure the financial integrity of brokers, clearing members and exchanges or other trading entities as a whole. A performance bond to clearing house refers to the minimum dollar deposit which is required by the clearing house from clearing members in accordance with their positions. Maintenance, or maintenance margin, refers to a sum, usually smaller than the initial performance bond, which must remain on deposit in the customer's account for any position at all times. In order to minimize risk to an exchange or other trading entity while minimizing the burden on members, it is desirable to approximate the requisite performance bond or margin requirement as closely as possible to the actual risk of the account at any given time.

Option pricing and risk management has often involved analyzing data from previous transactions. The data analyzed included price data from previous transactions. Previous approaches have included using interpolation and extrapolation algorithms.

Existing systems do not efficiently allow for the generation of pricing and margin requirements at the same time. Therefore there is a need in the art for more efficient systems and computer-implemented methods for pricing and risk management of options on futures.

SUMMARY

Embodiments of the present invention provide efficient computer systems and computer-implemented methods for pricing and risk management of options on futures. Aspects of the invention use volatility surfaces. A volatility surface is characterized by a set of delta points, namely the delta anchor points and the corresponding volatilities for each tradable contract.

Embodiments of the invention have several advantages when compared to existing systems and methods. For example, some systems and methods provide better integration between the product, pricing and risk workflow. Some embodiments provide for automation of volatility surface construction as well as cleansing.

Increased margin efficiencies may also be obtained with some embodiments of the invention. Embodiments may utilize a complete time series for implied volatility from vanilla option products to conduct analysis that require historical data usage and may preserve information from historical settlement prices to construction risk factors for margining. Some embodiments also result in systems that provide for improvements in pricing. The embodiments provide for call and put price reconciliation for European option products and cross product volatility surface reconciliation. Some embodiments preserve volatility surface's correlation, seasonality and curve shape implied by market in the history.

In various embodiments, the present invention can be partially or wholly implemented on a computer-readable medium, for example, by storing computer-executable instructions or modules, or by utilizing computer-readable data structures.

Of course, the methods and systems disclosed herein may also include other additional elements, steps, computer-executable instructions, or computer-readable data structures. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Aspects of the present invention may be implemented with computer devices and computer networks that allow users to exchange trading information. An exemplary trading network environment for implementing trading systems and methods is shown in FIG. 1.

An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

Figure 1:
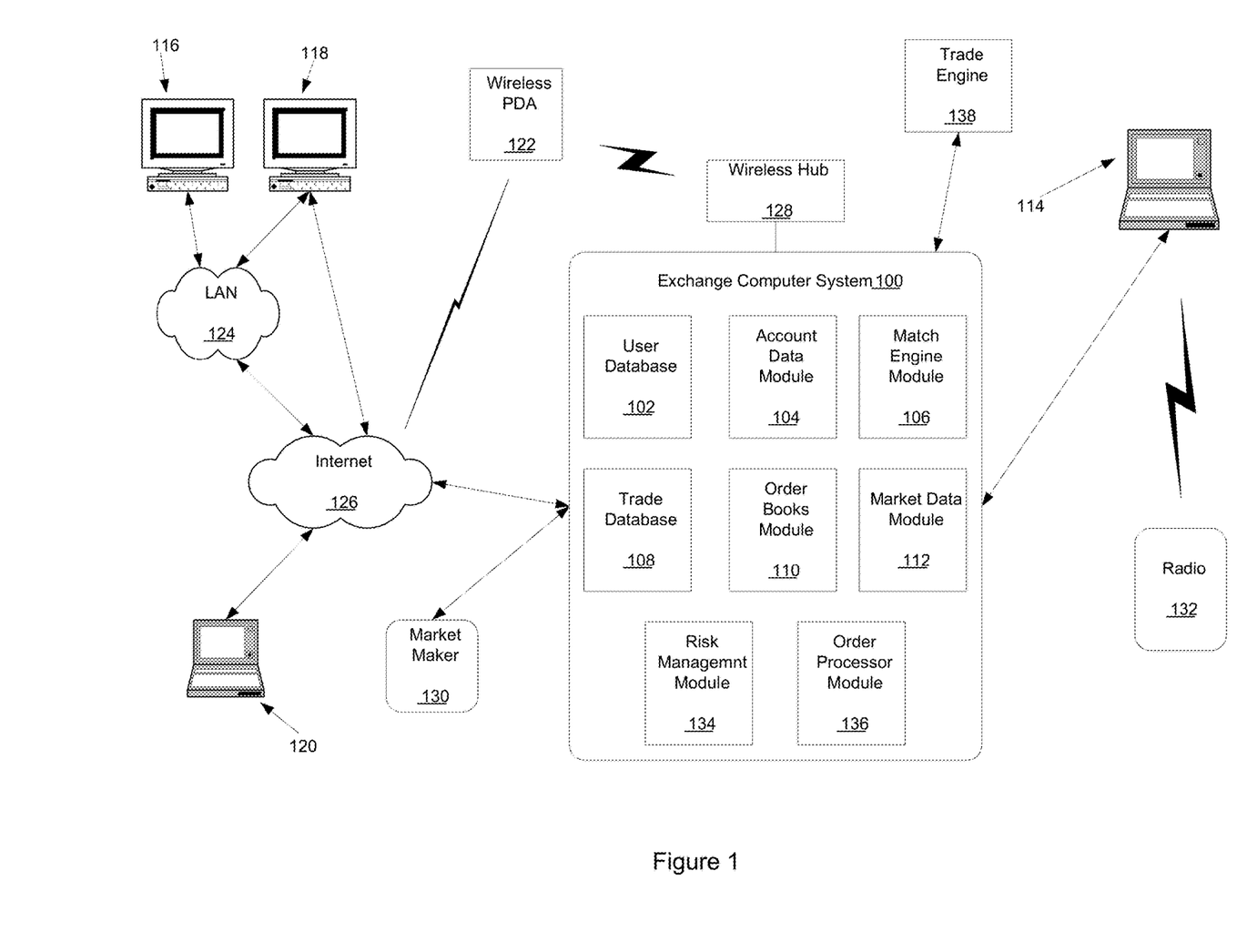
FIG. 1 shows a computer network system that may be used to implement aspects of the present invention.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a Ti line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

In one alternative embodiment, a clearinghouse computer or computer system may be included. A clearinghouse or other entity that clears trades may use a clearinghouse computer or computer system to accurately calculate swaption settlement prices, values, risk and margin requirements.

Volatility Surface Construction Methodology and Process.

Figure 2A:
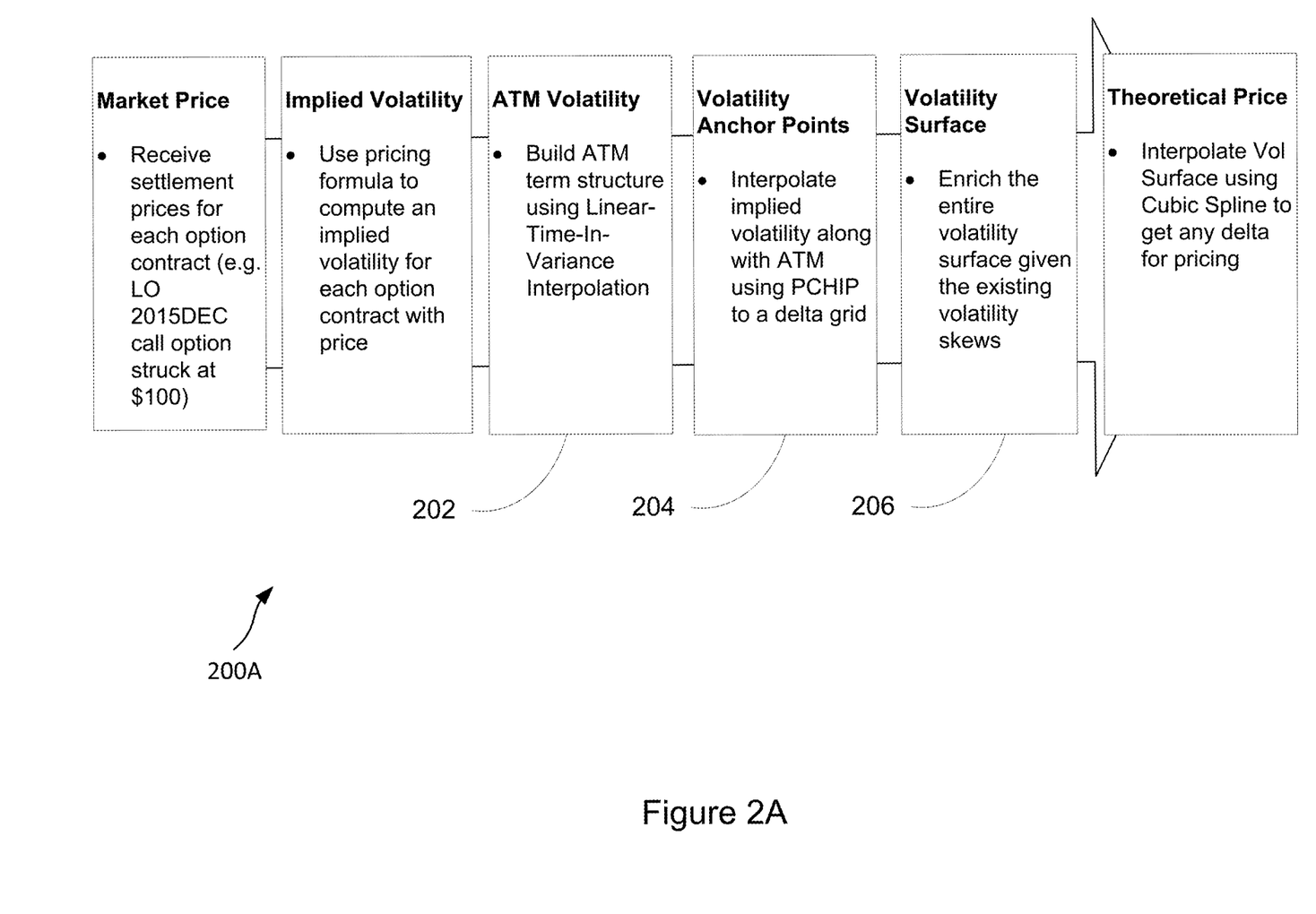
FIG. 2A and FIG. 2B are illustrative multi-stage diagrams of various embodiments of a volatility surface construction methodology in accordance with various aspects of the disclosure.

Referring to FIG. 2A, a multi-stage methodology 200A is illustrated in accordance with various aspects of the disclosure. Embodiments of the present disclosure relate to a novel and non-obvious technological improvement in a methodology for building a volatility surface from input market prices. The novel methodology results in measurable reduction in the quantity of storage memory space needed on a computer executing the novel methodology, and permits as-of-day calculations of the volatility surface that were previously impossible to obtain. The novel methodology also reduces the measurable, on-demand computational load on the processor(s) of a computer executing the novel methodology.

The disclosure contemplates the arrangement of some new and some existing techniques/formulas/algorithms into a system and collective process that is novel and results in a technological improvement. It is a process that involves both newly conceived techniques (e.g., propagation illiquid volatility surfaces with linear interpolation on anchor point differentials) and existing techniques (such as generally PCHIP interpolator and some linear-time-in-variance methods). Nevertheless, the end-to-end process is novel and non-obvious.

This disclosed process 200A allows volatility data to be represented for a single product (e.g., option contract) using approximately ten percent of the storage space needed on average over existing methodologies, and sixty percent space in other scenarios. The reduced memory storage requirements resulting from the novel and non-obvious technological improvements to the methodology for constructing a volatility surface represent patent eligible innovations.

Furthermore, the use of anchor points in various aspects of the methodology for constructing a volatility surface allows for a more generic and rational basis for managing risk. For example, existing margin tools, such as SPAN, look at risk on an instrument level (e.g., around two thousand points per day per product). However, embodiments of the disclosed methodology instead look at risk using the anchor points disclosed herein that require only approximately two hundred points per day per product, thus resulting in an order of magnitude reduction in the quantity of points that are required to be maintained, calculated, and/or updated each day.

For example, the disclosed methodology may store the volatility surface anchor points and reuse them for as-of-day computations, instead of recalibrating volatility for +10 years of historical data on a daily basis. This gain from reusable historical data reduces the on-demand computational load on the computer processor by needing to compute only one day's data instead of +10 years for each product. Thus, the reduced computational load requirements resulting from the novel and non-obvious technological improvements to the methodology for constructing a volatility surface represent patent eligible innovations.

Referring to FIG. 2A, the volatility surface is characterized by a set of delta points, namely the delta anchor points and the corresponding volatilities for each option expiration. Below are different steps 200A to constructing a volatility surface, in some examples, that can be used for option pricing and risk management purposes:

(stage a) compute implied volatility using corresponding option pricing model.

(stage b) define volatility surface axis based on modified option delta grid (skew dimension) and contract expiration (term structure dimension).

(stage c, see FIG. 2A, ref. 202) build at-the-money (ATM) term structure in stage, including (sub-step i) build skeleton volatility points: linear interpolation in delta between the closest-to-ATM options using one OTM call and one OTM put. For example, conditioning on the distance between option deltas, and enforcing liquid contract months (JUN/DEC) volatility to be from skeleton volatility depends on the product; (sub-step ii) if non-seasonal product, go to sub-step iii, else if seasonal product, compute backbone by using moving average on volatility skeleton points. Compute shape by subtracting backbone from skeleton points. Send backbone to sub-step iii; (sub-step iii) build term structure volatility points: filtered linear-time-in-variance, and filter out instantaneous volatility with a slope threshold; (sub-step iv) extrapolation on term structure using constant instantaneous volatility; (sub-step v) if non-seasonal, then step c is complete, else if seasonal, extrapolation on shape by copying over the nearest shape cycle, and adding the backbone curve with shape curve to arrive the final term structure.

(stage d, see FIG. 2A, ref. 204) Skew interpolation and extrapolation to get the anchor points based on implied volatility and ATM of a contract month. For example, PCHIP interpolation may be used to cover anchor points. And, tangent extrapolation to one addition anchor points, if any.

(stage e, see FIG. 2A, ref. 206) Full surface enrichment occurs, inter alia, by computing neighbor volatility add-on and linearly interpolate or extrapolate to fill in the missing anchor points in time to maturity space.

(stage f) The volatility surface constructed using the above procedure 200A may then be consumed by the pricing and risk management engine by following the steps: (a) cubic-spline interpolation with 3rd order polynomial extrapolation on anchor points for option pricing in skew space, and/or (b) using the anchor points one can simulate risk scenarios and evaluate portfolio risk exposures.

Figure 2B:
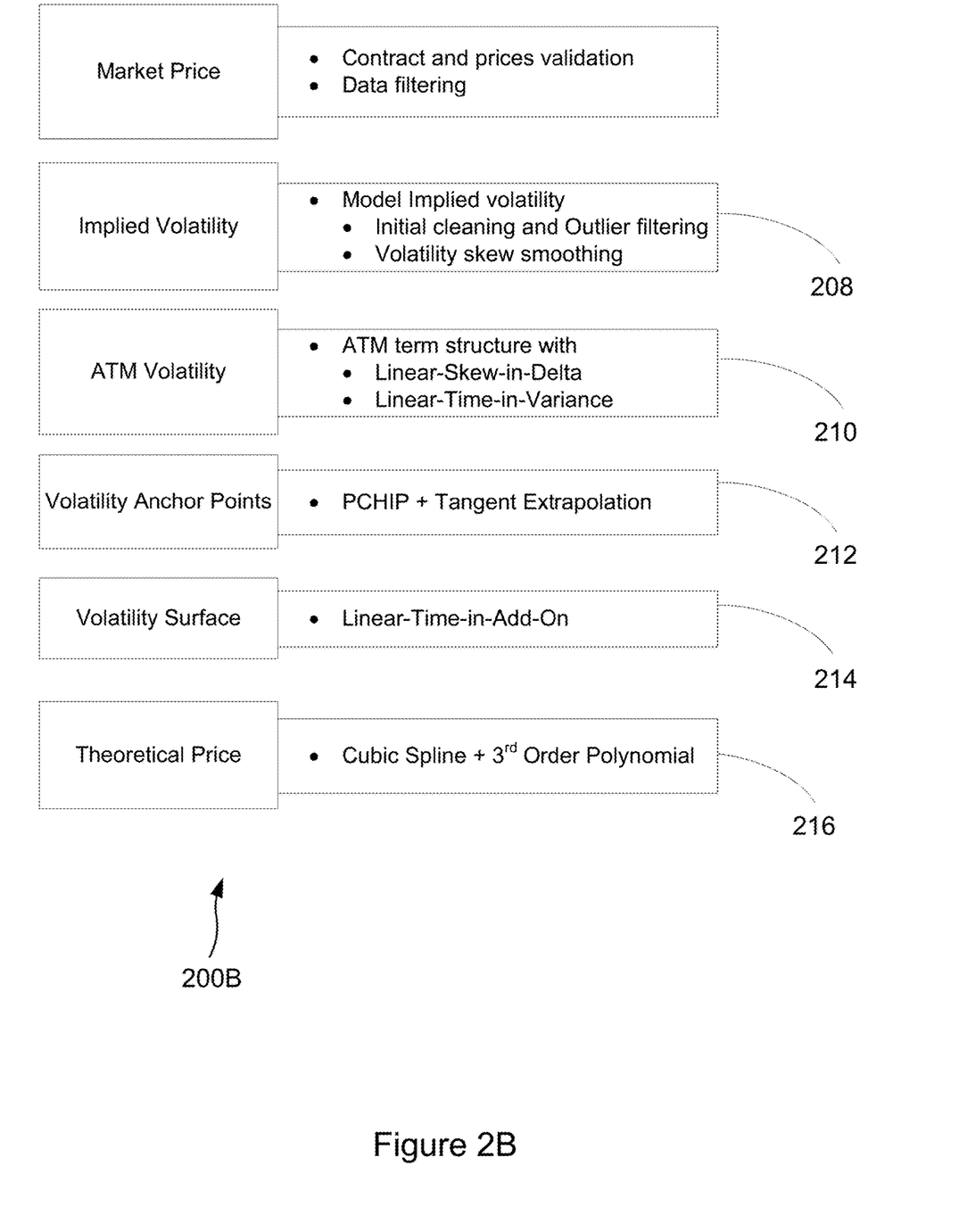

Referring to the multi-stage diagram 200B illustrated in FIG. 2B, a general overview of the volatility surface construction methodology (which was previously described on p. 2 of the appendix entitled, "Implied Volatility Surface Construction" in the priority, U.S. provisional patent application Ser. No. 62/277,605, which was already incorporated by reference in its entirety herein), may include one or more of the following steps/stages/modules: (A) Market price module (e.g., contract and prices validation, data filtering); (B) Implied volatility module (e.g., model implied volatility, initial cleaning and outlier filtering, volatility skew smoothing); (C) At-the-money (ATM) volatility module (e.g., ATM term structure with: (i) linear-skew-in-delta and/or (ii) linear-time-in-variance); (D) Volatility anchor points module (e.g., PCHIP and/or tangent extrapolation); (E) Volatility surface module (e.g., linear-time-in-add-on); and/or (F) Theoretical price module (e.g., cubic spline and/or third order polynomial).

In the first stage, market price, the system (e.g., risk management module 134) receives inputs from exchanges dealing in financial products and options contracts (e.g., market data module 112), wherein the inputs may comprise the following or similar data types of the same nature: option premium, option type (put or call), exercise style, strike, and/or time-to-expiry. In another example, input of risk free rate is deriving using OIS curve or an interest rate curve deemed fit.

In the implied volatility stage 208, the input (e.g., market prices) from the market price stage are used to calculate market implied volatility. In some examples, the calculating is done through either Black's model or Whaley's approximation and may include one or more of the following techniques: initial cleaning, outlier filtering, and/or volatility skew smoothing, all of which were described in more detail in the priority, U.S. provisional patent application Ser. No. 62/277,605, which was already incorporated by reference in its entirety herein.

In some examples, the implied volatility stage 208 also includes adjusting the volatility, for each volatility skew, so that it is smooth and shows upward trend on both wings. Each volatility skew may be formed, in some examples, by selected market volatility, in the range of half tick size (or any other tick size—e.g., quarter, 1.5, 0.75, or other) prices range. There are several desired feature for a volatility skew, which were previously explained on the appendix entitled, "Implied Volatility Surface Construction" white paper in the priority, U.S. provisional patent application Ser. No. 62/277, 605, which was already incorporated by reference in its entirety herein. However, natural cubic spline or a sole other method acting alone is unable to achieve all three features listed below. The novel methodology introduces a "combined interpolation schema" to obtain an ideal volatility skew. The three features are: smooth-meaning the first derivative is continuous; continuous—the model includes assumptions that pdf $(\partial^2 C)/(\partial K^2)$ is continuous, it is a useful feature if the second derivative of the volatility skew is continuous too; and no/less wiggles—seeing no wiggles in the vol. skew, thus local monotonic may be preferred.

In the at-the-money (ATM) volatility stage 210, the system builds an ATM volatility term structure for each date in history using, inter alia, calculated implied volatilities. As explained in more detail in the appendix entitled, "Implied Volatility Surface Construction" white paper in the priority, U.S. provisional patent application Ser. No. 62/277,605, which was already incorporated by reference in its entirety herein, different methods may be used to build ATM term structure for each of non-seasonal and seasonal products. In one example, for non-seasonal products, the building may be done using linear-time-in-variance interpolation. Meanwhile, for seasonal products, the building may be done using back-bone-plus-shape method, in some examples. In some examples, a skeleton of ATM term structure is first built using liquid contracts data. Then interpolation and extrapolation are performed on this skeleton to enrich the term structure to be a complete one. Regarding the use of liquid contracts data to build a skeleton of ATM term structure, Table 1 labeled "Product Overview" on p. 9 of the appendix entitled, "Pricing Error Analysis Framework, ver. 1.0" in the priority, U.S. provisional patent application Ser. No. 62/277, 605, which was already incorporated by reference in its entirety herein, six main groups are identified covering better liquidity energy options. The more liquid ones in each group are marked in Table 1, and all risk pricing for remaining products may calculated using this liquid product surface to price. A decomposition analysis of each of the six main groups reveals conclusions that are incorporated into the methodology disclosed herein.

In the volatility anchor points stage 212, the system constructs partial anchor points using implied volatility along with ATM point in each skew. In some examples, the constructing of partial anchor points is done by piecewise cubic hermite interpolating polynomial (PCHIP) method (and/or tangent extrapolation). As explained in more detail in the appendix labeled "Implied Volatility Surface Construction" white paper in the priority, U.S. provisional patent application Ser. No. 62/277,605, which was already incorporated by reference in its entirety herein, once a volatility surface skeleton has been created, the remaining anchor points are filled to reach a complete volatility surface. In some examples, the basic idea is to fill up volatility add-on from neighbor delta term structure. Each term structure will be filled upon previous one, which means the term structures propagate from ATM to each side.

The volatility surface construction has been improved, in some examples, from at least one to three different perspectives, which were previously explained on the second page of the appendix entitled, "Implied Volatility Surface Cleansing Procedure ¬® 2014 CME Group, Inc." in the priority, U.S. provisional patent application Ser. No. 62/277,605, which was already incorporated by reference in its entirety herein: (1) Skew Curve Fix (e.g., wiggle free/ATM wiggle, Outlier free, improper extrapolation, and good re-pricing result); (2) Term structure (e.g., outlier free, seasonality consistent, tail controlled, spike, filter failure, ATM level inconsistency, aligned across different products (European versus American)); and/or (3) time series (e.g., stable (unstable surface), reasonable correlation (correlation break)).

Figure 3:
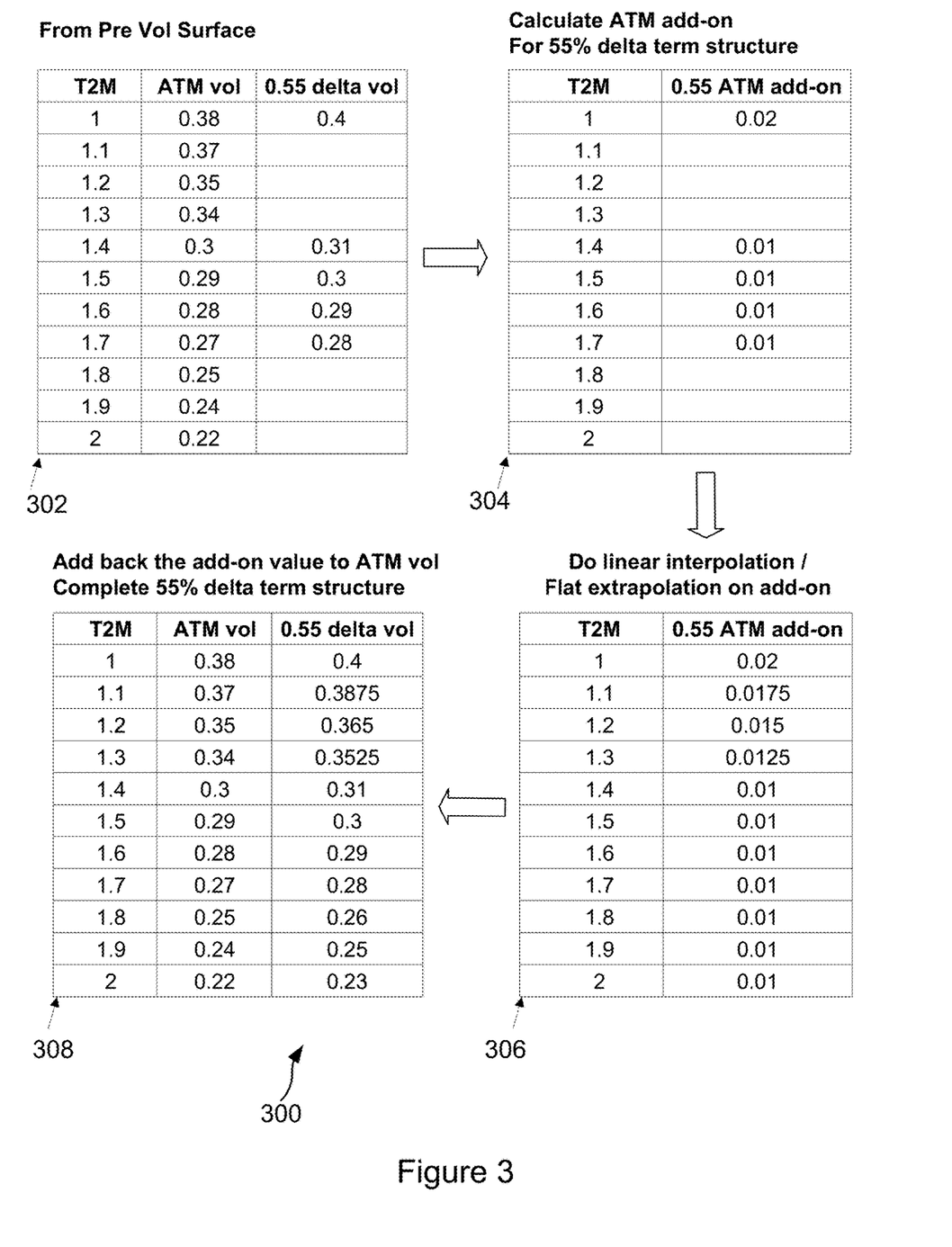
FIG. 3 is a depiction of a table in computer memory using less memory and/or reduced computing load due to aspects of the improved volatility surface construction methodology disclosed herein.

In the volatility surface stage 214, the system enriches partial volatility surface by linear-time-in-add-on. This may include extrapolating to enrich the volatility surface using linear-in-add-on (which was previously explained on p. 24 of the appendix entitled, "Implied Volatility Surface Construction ¬® 2014 CME Group, Inc." in the priority, U.S. provisional patent application Ser. No. 62/277,605, which was already incorporated by reference in its entirety herein). In some examples, the linear-in-add-on methodology 300 may comprise multiple steps, such as propagating from ATM to each wing. Then computing add-on from neighbor delta values 304 from a pre volatility surface 302, as illustrated in FIG. 3. Next, linearly interpolating the add-on from term structure, as illustrated in FIG. 3, ref. 306. Finally, computing the volatility, including iteratively looping through the previous steps until reaching the last anchor point 1% and 99%, as illustrated in FIG. 3, ref. 308. For example, with the delta point 0.55 (assuming it's always next to ATM), the system may want to construct point:

$$\left(\tau, \Delta\sigma_\tau^{ATM}\right) \text{ with } \left(\tau_i, \Delta\sigma_i^{ATM}\right), \left(\tau_{i+1}, \Delta\sigma_{i+1}^{ATM}\right) \quad \text{Equation 1}$$

$$\Delta\sigma_{\tau_i}^{ATM} = \sigma_{\tau_i}^{0.55} - \sigma_{\tau_i}^{ATM}$$

$$\Delta\sigma_\tau^{ATM} = \frac{\Delta\sigma_{i+1}^{ATM} - \Delta\sigma_i^{ATM}}{\tau_{i+1} - \tau_i}(\tau - \tau_i) + \Delta\sigma_i^{ATM}, \tau_i < \tau < \tau_{i+1}$$

$$\sigma_\tau = \sigma_\tau^{ATM} + \Delta\sigma_\tau^{ATM}$$

Referring to FIG. 2B, in the theoretical stage 216, the system may interpolate volatility surface using cubic spline, 3rd order polynomial, and/or tangent method to get any volatility for pricing. For European options, the system may use Black's model for future options. For American options, they system may use Whaley's approximation under Black's framework. Meanwhile, for futurized option the system may use a special form of Black's model, as described in the priority, U.S. provisional patent application Ser. No. 62/277,605, which was already incorporated by reference in its entirety herein. Futurized option means that everyday profit and loss is going to be calculated and margin is going to be collected, which is not standard practice for vanilla options. The following equation for pricing futurized call option, shows that there is no risk free rate involved:

$$c(t) = F \times N(d_1) - K \times N(d_2) \quad \text{Equation 2}$$

where $d_1 =$ $(\ln(F/K) + (1/2)\sigma^2(T-t))/(\sigma\sqrt{(T-t)})$ and $d_2 = d_1 - \sigma\sqrt{(T-t)}$.

The theoretical and risk pricing is performed to validation the quality of volatility surface build such that errors may be decomposed and/or explained, and that the magnitude and reason are within a predefined acceptance range. Liquid contracts data is used to build a skeleton of ATM term structure, and six main groups are identified covering better liquidity energy options. The more liquid contracts in each group are marked in Table 1 (which was labeled "Product Overview" on p. 9 of the appendix entitled, "Pricing Error Analysis Framework, ver. 1.0" in the priority, U.S. provisional patent application Ser. No. 62/277,605, which was already incorporated by reference in its entirety herein) and all risk pricing for remaining products may calculated using this liquid product surface to price. A decomposition analysis of each of the six main groups reveals conclusions that are incorporated into the methodology disclosed herein.

After being constructed, there are numerous uses of the volatility surface, as explained in the priority, U.S. provisional patent application Ser. No. 62/277,605, which was already incorporated by reference in its entirety herein. In addition, the volatility surface may undergo cleansing methodologies and/or pricing decomposition.

Volatility surface cleansing methods include, but are not limited to:
a. Price validation.
   i. Align option prices according to trading and expiration calendars.
   ii. Remove option prices corresponding to large strikes without volume and open interest.
   iii. Remove zero prices.
b. Implied volatility filter and adjustment.
   i. Remove implied volatility based on option spread arbitrage violation.
   ii. Outlier identification and filtering by using $3^{rd}$ order robust fit.
   iii. Smooth implied volatilities for each contract month (skew) within option tick size.
c. Insufficient data
   i. ATM term structure: JUN-DEC contract builder with Power function fit.
   ii. Front month missing ATM: PCHIP interpolator with ATM solver
   iii. Front month missing skew: parallel shift with ATM solver
   iv. Time series interpolation based on time-to-maturity d. Skew level adjustment
   v. Volatility skew shifts based on ATM point from term structure Furthermore, pricing decomposition may be used to justify volatility surface construction and exposure weaknesses in methodology. Ideally, we should achieve accurate pricing with the constructed surface. This framework will help us understand the error, and expose its potential propagation into risk management or other downstream application consuming this data. This can also help us to ensure the data integrity and identify outlier data with erroneous pricing. Below, examples of theoretical pricing decomposition, risk pricing decomposition, and ITM pricing decomposition are discussed in more detail below.

Theoretical Pricing Decomposition. Pricing error is defined as the difference between theoretical prices (derived from volatility surface constructions) and market prices (settlement prices). For each market price, the error is decomposed into three additive parts
   i. Construction error. This is defined as option Vega multiplied by anchor-construction interpolated volatility difference, which is PCHIP interpolated volatility (from anchor points) minus implied volatility.

$$\varepsilon_c = v \cdot (\sigma_{pchip} - \sigma_{market})$$

ii Reconstruction error. This is defined as option Vega multiplied by anchor-reconstruction interpolated volatility difference, which is Cubic-spline interpolated volatility (from anchor points) minus PCHIP interpolated volatility (from anchor points).

$$\varepsilon_r = v \cdot (\sigma_{cubicspline} - \sigma_{pchip})$$

iii. Unexplained error. This is defined as total pricing error minus construction error minus reconstruction error.

$$r = P(\sigma_{cubicspline}) - P(\sigma_{market}) = \varepsilon - \varepsilon_c - \varepsilon_r$$

Risk Pricing Decomposition. Risk pricing is to compute an option price using a counterpart option's volatility surface, where the counterpart option is the most liquid vanilla option on the same underlying. The pricing error is defined as the difference between the prices defined using the risk pricing procedure and the market prices. For each market price, the error is decomposed into the 4 additive parts:
   i. Skew Divergence error. This is defined as option Vega multiplied by implied volatility difference. Implied volatility difference is implied volatility from this option minus implied volatility from counterpart option.

$$\varepsilon_d = v \cdot (\sigma_{market}^{counterpart} - \sigma_{market})$$

ii Construction error. This is defined as option Vega multiplied by anchor-construction interpolated volatility difference, which is PCHIP interpolated volatility (from anchor points) minus counterpart option implied volatility.

$$\varepsilon_c = v \cdot \left(\sigma_{pchip}^{counterpart} - \sigma_{market}^{counterpart}\right)$$

iii. Reconstruction error. This is defined as option Vega multiplied by anchor-reconstruction interpolated volatility difference, which is Cubic-spline interpolated volatility (from anchor points) minus counterpart option PCHIP interpolated volatility (from anchor points).

$$\varepsilon_r = v \cdot \left(\sigma_{cubicspline}^{counterpart} - \sigma_{pchip}^{counterpart}\right)$$

iv. Unexplained error. This is defined as total pricing error minus construction error minus reconstruction error.

$$r = P\left(\sigma_{cubicspline}^{counterpart}\right) - P(\sigma_{market}) = \varepsilon - \varepsilon_d - \varepsilon_c - \varepsilon_r$$

ITM Pricing Decomposition. ITM options can have addition pricing error due to interest rate error resulting in violation of put-call parity for European options. This error is linear to option "absolute moneyness"—i.e. difference between strike and underlying price.

i. Interest rate error. This is an artificial error with restoration of interest rate in pricing due to loss of historical rate input data. It implicitly augments market volatility differences of two options.

$$\varepsilon_i = \left(P_{call}^{European} - P_{put}^{European}\right) - (F - K)e^{-r\tau}$$

ii. Skew Divergence error. This is defined as true divergence in market implied volatility. Computed as option Vega multiplied by implied volatility difference, readjusted by interest rate. Implied volatility difference is implied volatility from this option minus implied volatility from counterpart option.

$$\varepsilon_d = v \cdot \left(\sigma_{market}^{OTM} - \sigma_{market}^{ITM}\right) - \varepsilon_i$$

iii. Construction error. This is defined as option Vega multiplied by anchor-construction interpolated volatility difference, which is PCHIP interpolated volatility (from anchor points) minus counterpart option implied volatility.

$$\varepsilon_c = v \cdot \left(\sigma_{pchip}^{OTM} - \sigma_{market}^{OTM}\right)$$

iv. Reconstruction error. This is defined as option Vega multiplied by anchor-reconstruction interpolated volatility difference, which is Cubic-spline interpolated volatility (from anchor points) minus counterpart option PCHIP interpolated volatility (from anchor points).

$$\varepsilon_r = v \cdot \left(\sigma_{cubicspline}^{OTM} - \sigma_{pchip}^{OTM}\right)$$

v. Unexplained error. This is defined as total pricing error minus construction error minus reconstruction error.

$$r = P\left(\sigma_{cubicspline}^{OTM}\right) - P\left(\sigma_{market}^{ITM}\right) = \varepsilon - \varepsilon_d - \varepsilon_c - \varepsilon_r - \varepsilon_i$$

In accordance with various aspects of the disclosure, the system permits as-of-day calculations of the volatility surface that were previously impossible to obtain in near real-time by using preprocessing of data so that it can later be used as inputs for daily margin calculations. Without such preprocessing, it may not be possible to process such volume of data at run-time for daily margin calculations. The preprocessed data may be stored in computer memory of the system such that it is available for as-of-day calculations and near real-time display of volatility surface calculations.

In accordance with various aspects of the disclosure, the system permits as-of-day calculations of the volatility surface that were previously impossible to obtain in near real-time by using preprocessing of data so that it can later be used as inputs for daily margin calculations. Without such preprocessing, it may not be possible to process such volume of data at run-time for daily margin calculations. The preprocessed data may be stored in computer memory of the system such that it is available for as-of-day calculations and near real-time display of volatility surface calculations.

In accordance with various aspects of the disclosure, a method, performed by a computer, is disclosed to construct a volatility surface in near real-time for an option contract using less memory and overall computational load than prior art volatility surface constructions. The method may, in some examples, further include a step of performing the aforementioned validation methods disclosed herein to determine eligibility of prices and implied volatility as inputs (1) arbitrage validation using a proprietary algorithm (2) outlier identification using robust fit, in addition to other steps disclosed herein. In some examples, the method may further generate a complete implied volatility surface represented by a predetermined set of option-Delta anchor points covering liquid and illiquid markets, regardless of whether financial market provides liquidity and whether related financial instrument prices can be observed. In some examples, the method may include wherein for non-seasonal option contracts, the method step employs a liquidity filter to locate liquid implied volatility points and the building step uses interpolation and extrapolation to ensure such term structure is complete. In some examples, the method may include wherein for ATM term structure construction, the method employs a solver that uses linear or spline function to calibrate accurate ATM volatility. In some examples, the method may include wherein for market data validation, the method employs robust fit methodology to identify outlying volatility points through an iterative search process with a proprietary stopping criteria. In some examples, the method may include wherein for market data validation, the method employs a proprietary algorithm to identify spread and arbitrage opportunities.

Furthermore, in some examples, the aforementioned method may further include wherein for seasonal option contracts, the building step uses back-bone-plus-shape methodology with a proprietary instantaneous volatility filtering technique. In some examples, the method may include wherein the constructing of the plurality of fixed anchor points is done by piecewise cubic hermite interpolating polynomial (PCHIP) method and/or other spline interpolation methods. In some examples, the method may include wherein the constructing of the plurality of fixed anchor points is also done by tangent extrapolation and/or other linear or spline extrapolation methods. In some examples, the method may include wherein the constructing of illiquid volatility anchor points is done using a proprietary linear-time-in-add-on methodology. In some examples, the method may include wherein pricing error validation is performed by defining a specific error decomposition model to perform explanatory analysis.

In accordance with various aspects of the disclosure, a system is disclosed further comprising a memory storing computer-readable instructions organized into modules that, when executed by the computer processor, cause the system to validate, by a validator module, market prices and volatility for an array of option contract—a.k.a. skew—such that the prices are arbitrage free and/or that the volatility are outlier filtered. The validator module may also be embodied in a tangible computer memory storing computer-executable instructions that, when executed by a processor of a computer, cause the computer to construct a volatility surface for an option contract using less memory and overall computational load than prior art volatility surface constructions.

The present disclosure has been described herein with reference to specific exemplary embodiments thereof. It will be apparent to those skilled in the art that a person understanding this disclosure may conceive of changes or other embodiments or variations, which utilize the principles of this disclosure without departing from the broader spirit and scope of the disclosure as set forth in the appended claims. For example, various methods are disclosed herein with steps that are performed in exemplary orders. In alternative embodiments the steps may be performed in other orders without departing from the broader spirit and scope of the disclosed features. All variations and alternative embodiments are considered within the sphere, spirit, and scope of the disclosure.

The invention claimed is:

1. A computer implemented method for real time construction of a volatility surface of an option contract with a reduced consumption of memory and computational load, the method comprising:
  receiving, by a computer processor, inputs from an exchange computer system coupled therewith;
  upon receipt of the inputs, preprocessing the inputs to place the data into a preprocessed form to allow for near real time computational response by the computer processor in response to as-of-day volatility surface requests, the preprocessing including:
    generating historical market implied volatility data by calculating, by the computer processor, a market implied volatility for the option contract based on the received inputs for a plurality of historical dates;
    reducing the historical market implied volatility data into a plurality of fixed anchor points occupying less data storage than that needed to store the historical market implied volatility data by:
      building a skeleton, from which a volatility surface may be derived, by building, by the computer processor, an at-the-money (ATM) term structure for the plurality of historical dates using the calculated market implied volatility;
      constructing, by the computer processor using the ATM term structure and the market implied volatility, the plurality of fixed anchor points on the skeleton, wherein the plurality of fixed anchor points are constructed by filling up volatility add-on from neighbor delta term structure;
      adjusting, by the computer processor, at least one of the plurality of fixed anchor points for at least one of a plurality of volatility skews;
      enriching, by the computer processor, the skeleton by:
        (a) propagating from ATM term to each wing;
        (b) computing linear-in-add-on from neighbor delta values;
        (c) linearly interpolating the linear-in-add-on from term structure; and
        (d) computing volatility by iteratively looping through steps (a)-(c) until reaching a last, fixed anchor point;
      interpolating, in near real time by the computer processor, the enriched skeleton to derive a volatility surface that provides volatility for pricing; and
      storing the plurality of fixed anchor points in a non-transitory memory coupled with the computer processor and the exchange computer system, the plurality of fixed anchor points occupying less data storage than that needed to store the historical market implied volatility data; and
  wherein the method further comprises:
  outputting, by the computer processor, a margin calculation for the option contract based on the derived volatility surface, and
  after preprocessing, receiving a request for a near real time display of the derived volatility surface; and
  computing, by the computer processor and for a time of the request, an as-of-day volatility surface using the stored plurality of fixed anchor points without recalibration of historical volatility data.

2. The computer implemented method of claim 1, wherein the inputs comprise at least one of: option premium, strike, and time-to-expiry.

3. The computer implemented method of claim 1, wherein the building of the ATM term structure comprises building, by the computer, the skeleton of the ATM term structure using liquid contract data, and enriching the ATM term structure via interpolation and extrapolation of the skeleton.

4. The computer implemented method of claim 1, wherein the constructing of the plurality of fixed anchor points comprises filling up, by the computer processor, volatility add-on from neighbor delta term structure.

5. The computer implemented method of claim 1, wherein the at least one of the plurality of volatility skews is formed by selected market volatility in a predetermined price range.

6. The computer implemented method of claim 1, wherein the enriching of the skeleton further comprises:
  iteratively looping through steps (a)-(c) until reaching the last, fixed anchor point which includes fixed anchor points ranging from 1% and 99%.

7. The computer implemented method of claim 1, wherein the ATM term structure is outlier free, seasonality consistent, and aligned across different products.

8. The computer implemented method of claim 1, wherein the options contract comprises a non-seasonal option contracts and wherein the building of the ATM term structure further uses linear-time-in-variance interpolation.

9. The computer implemented method of claim 1, wherein when the options contract comprises a seasonal option contract, the building of the ATM term structure further uses back-bone-plus-shape methodology.

10. The computer implemented method of claim 1, wherein the constructing of the plurality of fixed anchor points comprises a piecewise cubic hermite interpolating polynomial (PCHIP) method.

11. The computer implemented method of claim 10, wherein the constructing of the plurality of fixed anchor points further comprises tangent extrapolation.

12. The computer implemented method of claim 1, wherein the at least one of the plurality of volatility skews is wiggle free and outlier free.

13. The computer implemented method of claim 1, wherein the interpolating is performed using at least one of: cubic spline, 3rd order polynomial, and tangent method.

14. The computer implemented method of claim 1, wherein the option contract is an European-style option and uses a Black's model for pricing.

15. The computer implemented method of claim 1, wherein the option contract comprises an American-style option and uses Whaley's approximation for pricing.

16. A computer system comprising:
a computer processor coupled with an exchange computer system and a non-transitory memory, the non-transitory memory storing computer-readable instructions that, when executed by the computer processor, cause the computer processor to:
for preprocess of inputs received from the exchange computer system to place the data into a preprocessed form to allow for near real time computational response by the computer processor in response to as-of-day volatility surface requests:
generate historical market implied volatility data via calculation of a market implied volatility for an option contract based on the inputs received from the exchange computer system for a plurality of historical dates;
reduce the historical market implied volatility data into a plurality of fixed anchor points occupying less data storage than that needed to store the historical market implied volatility data via:
building of a skeleton, from which a volatility surface may be derived, by building an at-the-money (ATM) term structure for the plurality of historical dates using the market implied volatility;
construction of the plurality of fixed anchor points on the skeleton using the ATM term structure and the market implied volatility, wherein the plurality of fixed anchor points are constructed by filling up volatility add-on from neighbor delta term structure;
adjustment of at least one of the plurality of fixed anchor points for at least one of a plurality of volatility skews;
enrichment of the skeleton by:
(a) propagating from ATM term to each wing;
(b) computing linear-in-add-on from neighbor delta values;
(c) linearly interpolating the linear-in-add-on from term structure; and
(d) computing volatility by iteratively looping through (a)-(c) until reaching a last, fixed anchor point; and
interpolation of, in near real time, the enriched skeleton to derive a volatility surface that provides volatility for pricing;
output of, subsequent to the construction of the volatility surface, a margin calculation for the option contract based on the volatility surface; and
storage of the plurality of fixed anchor points in a non-transitory memory coupled with the computer processor and the exchange computer system, the plurality of fixed anchor points occupying less data storage than that needed to store the historical market implied volatility data;
after the preprocess of the inputs, receiving a request for a near real time display of the derived volatility surface; and
compute, for a time of the request, an as-of-day volatility surface using the stored plurality of fixed anchor points without recalibration of historical volatility data.

17. The computer system of claim 16, wherein the at least one of the plurality of volatility skews is formed by selected market volatility in a predetermined size price range.

18. The computer system of claim 16, wherein the ATM term structure is outlier free, seasonality consistent, and aligned across different products; and wherein the iteratively looping until reaching the last, fixed anchor point includes fixed anchor points ranging from 1% and 99%.

19. The computer system of claim 16, wherein the building of the ATM term structure further comprises: building the skeleton of ATM structure using liquid contract data; interpolating on the skeleton to enrich the ATM term structure; and extrapolating on the skeleton to enrich the ATM term structure.

20. A tangible computer memory storing computer-executable instructions that, when executed by a processor of a computer, cause the computer to:
receive inputs from an exchange computer system;
for preprocess of the inputs to place the data into a preprocessed form to allow for near real time computational response by the computer processor in response to as-of-day volatility surface requests:
construct, responsive to receipt of the inputs, a volatility surface for an option contract in near real-time by:
generate historical market implied volatility data via calculation of a market implied volatility for the option contract based on the received inputs for a plurality of historical dates;
reduce the historical market implied volatility data into a plurality of fixed anchor points occupying less data storage than that needed to store the historical market implied volatility data via:
building of a skeleton, from which a volatility surface may be derived, by building an at-the-money (ATM) term structure for a plurality of historical dates using the market implied volatility;
construction of the plurality of fixed anchor points on the skeleton using the ATM term structure and the volatility, wherein the plurality of fixed anchor points are constructed by filling up volatility add-on from neighbor delta term structure;

adjustment of at least one of the plurality of fixed anchor points for at least one of a plurality of volatility skews;

enrichment of the skeleton by:
- (a) propagation from ATM term to each wing;
- (b) computation of linear-in-add-on from neighbor delta values;
- (c) linear interpolation of the linear-in-add-on from term structure; and
- (d) computation of volatility by iterative loop through (a)-(c) until a last, fixed anchor point is reached;

interpolation, in near real time, of the enriched skeleton to derive the volatility surface that provides volatility for pricing;

output of, subsequent to the construction of the volatility surface, a margin calculation for the option contract based on the derived volatility surface; and storage of the plurality of fixed anchor points in a non-transitory memory coupled with the computer processor and the exchange computer system, the plurality of fixed anchor points occupying less data storage than that needed to store the historical market implied volatility data; and further after the preprocess of the inputs, receiving a request for a near real time display of the derived volatility surface; and compute, for a time of the request, an as-of-day volatility surface using the stored plurality of fixed anchor points without recalibration of historical volatility data.

21. The tangible computer memory of claim 20, wherein the building of the ATM term structure further comprises:

building of the skeleton of ATM term structure using liquid contract data;

interpolation on the skeleton to enrich the ATM term structure; and extrapolation on the skeleton to enrich the ATM term structure.

22. The tangible computer memory of claim 20, wherein the at least one of the plurality of volatility skews is formed by selected market volatility in a predetermined size price range.

23. The tangible computer memory of claim 20, wherein the construction of the plurality of fixed anchor points is done by piecewise cubic hermite interpolating polynomial (PCHIP) method, and wherein the iterative loop until reaching the last, fixed anchor point includes fixed anchor points ranging from 1% and 99%.

24. The tangible computer memory of claim 20, wherein for non-seasonal option contracts, the building of the ATM term structure uses linear-time-in-variance interpolation, and for seasonal option contracts, the building of the ATM term structure uses back-bone-plus-shape methodology.

* * * * *